April 5, 1966 M. TANFERNA ETAL 3,244,157
ROTARY FLUID ENGINE WITH DRIVEN VANES, PARTICULARLY
FOR INTERNAL COMBUSTION ENGINES
Filed July 19, 1962 4 Sheets-Sheet 1

INVENTORS.
MARIO TANFERNA
ARNALDO CASTAGNA
BY
Kelman and Berman
AGENTS

April 5, 1966 M. TANFERNA ETAL 3,244,157
ROTARY FLUID ENGINE WITH DRIVEN VANES, PARTICULARLY
FOR INTERNAL COMBUSTION ENGINES
Filed July 19, 1962 4 Sheets-Sheet 2

INVENTORS.
MARIO TANFERNA
ARNALDO CASTAGNA
BY

*Kelman and Berman*

AGENTS

INVENTORS.
MARIO TANFERNO
ARNALDO CASTAGNA
BY

Kelman and Berman

AGENTS

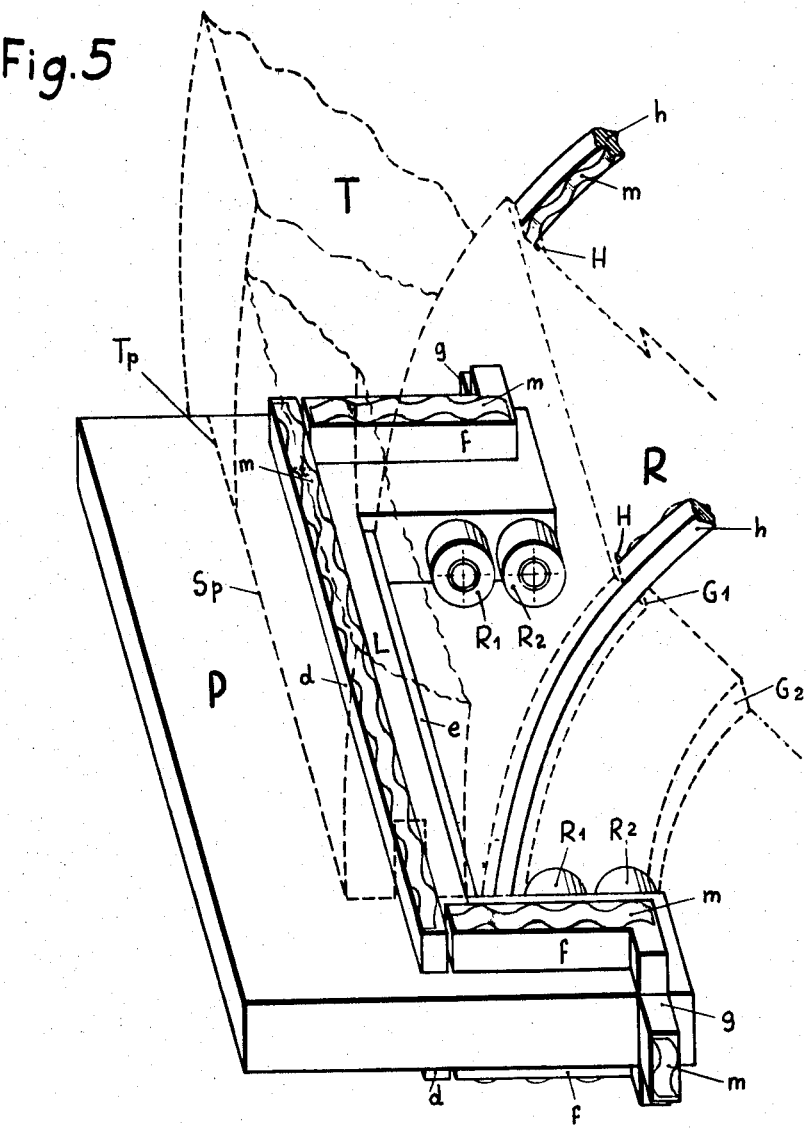

United States Patent Office 3,244,157
Patented Apr. 5, 1966

3,244,157
ROTARY FLUID ENGINE WITH DRIVEN VANES, PARTICULARLY FOR INTERNAL COMBUSTION ENGINES
Mario Tanferna and Arnaldo Castagna, Rome, Italy, assignors to Rotor Società Meccanica Italiana S.p.A., Rome, Italy
Filed July 19, 1962, Ser. No. 210,970
Claims priority, application Italy, July 26, 1961, 13,519/61
7 Claims. (Cl. 123—14)

The present invention relates to rotary fluid engines, motors, compressors and pumps, and particularly to a rotary internal combustion engine.

Known fluid engines mainly consist of a stator and a rotor, one of these principal members being lobed; buckets or vanes divide the internal space enclosed between the two members, into chambers or compartments of a volume which varies cyclically with the movement of the rotor.

The difficulties encountered in motors of this type are due to gas leakages at high temperatures and pressures, to high contact pressures between sliding parts which are not capable of being cooled or lubricated and to inadequate distribution of the working fluid.

The present invention aims at solving these difficulties.

Other objects of the invention will become apparent from the following description, when taken with reference to the accompanying drawings, in which:

FIG. 5 is a fragmentary perspective view of a vane of the device of FIG. 3 and of adjacent elements.

Figure 1:
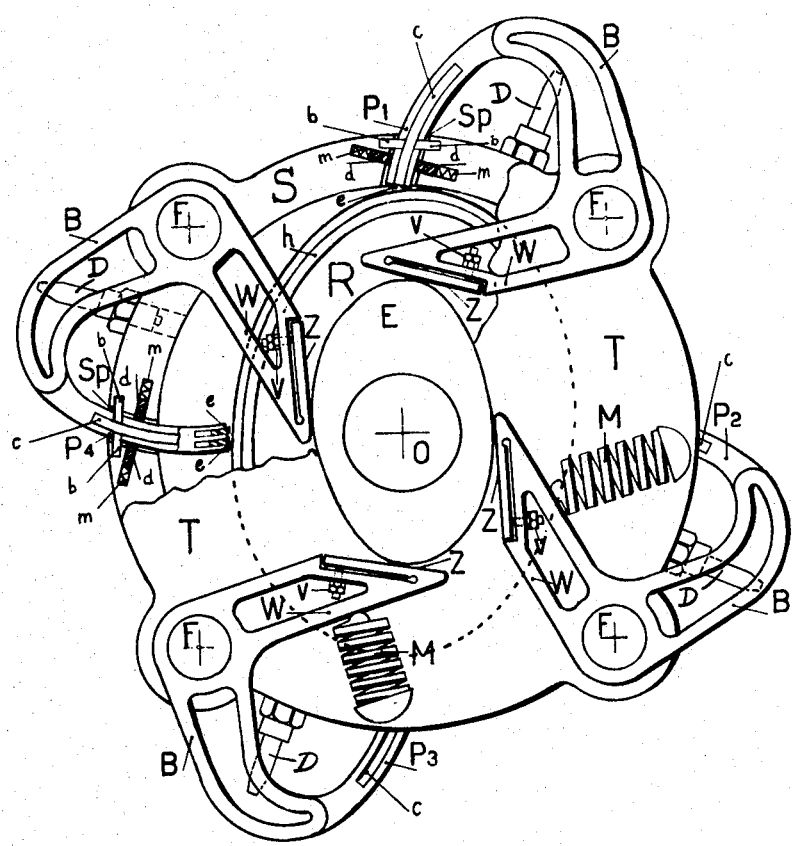
FIG. 1 is an axial end view, partly in section, of a preferred embodiment of the invention.

Referring initially to FIG. 1, there is shown a substantially cylindrical hollow stator S in which a shaft O is coaxially rotatably mounted. The shaft O carries a rotor R of ovoid cross section within the stator cavity, and an eccentric E of corresponding cross section outside the stator cavity. Four pivot pins F whose axes are parallel to that of the shaft O are equiangularly spaced on the radial end face of the stator S about the shaft O.

Each pivot pin F supports a rocker one arm W of which has a cam follower shoe Z on its free end. The face of the shoe Z may be adjusted toward and away from the cam face of the eccentric E by a set screw V. The shoes Z are held in engagement with the curved face of the eccentric E by respective helical compression springs M mounted on the stator S.

The other arms B of the four rockers carry respective vanes $P_1$, $P_2$, $P_3$, $P_4$. The vanes are portions of hollow cylinders centered on the axes of the associated pins F. The vanes are held in a precisely determined position relative to the curved surface of the rotor S by the springs M and the eccentric E, and move inward and outward of the stator cavity as the rotor rotates.

The pins F which are located outside the stator cavity are easily cooled and lubricated. They absorb all stresses transmitted from the gases in the stator cavity to the vanes. The vanes may be made hollow in order to render them lighter and to facilitate their cooling. The vanes may have a weight and operate at a velocity comparable to the weight and velocity of the valves of reciprocating internal combustion engines.

The vanes slide freely with minimum clearance between the walls of axial slots Sp of the stator S. The movement of each vane is controlled in such a manner that its axially extending end face is held closely adjacent the curved surface of the rotor R, but substantially without touching the same.

There are outward leakage paths for the gases from the stator cavity between the vanes and the axial walls of the slots Sp, between the flat, axially terminal faces of each vane and the opposite surfaces of the stator heads, and between the inner end face of each vane and the curved surface of the rotor. The leakage through the slots Sp is prevented by sealing members b and d, which are arranged in cooled and lubricated seats in the stator S and are biased by springs m toward the cooperating vane surfaces, and by sealing members c in the flat, axially terminal faces of each vane which are pressed against the flat faces of the stator. Sealing members e movably disposed in the internal end face of each vane are pressed by non-illustrated springs similar to the springs m against the curved surface of the rotor R.

The radial interfaces between the rotor and the stator heads are sealed by annular sealing members h, arranged on the rotor and following its contour as far as possible.

During each turn of the rotor the volume of each of the four chambers enclosed between the stator, the rotor, and two vanes passes successively through a first maximum value, a first minimum, a second maximum, and a second minimum. The two maxima as well as the two minima are different from each other because of the ovoid rotor shape and its eccentric mounting on the shaft O. Because of the cyclic variation of chamber volume, the apparatus of FIG. 1 may be operated as a four stroke internal combustion engine by means of spark plugs D in each chamber.

Figure 2:
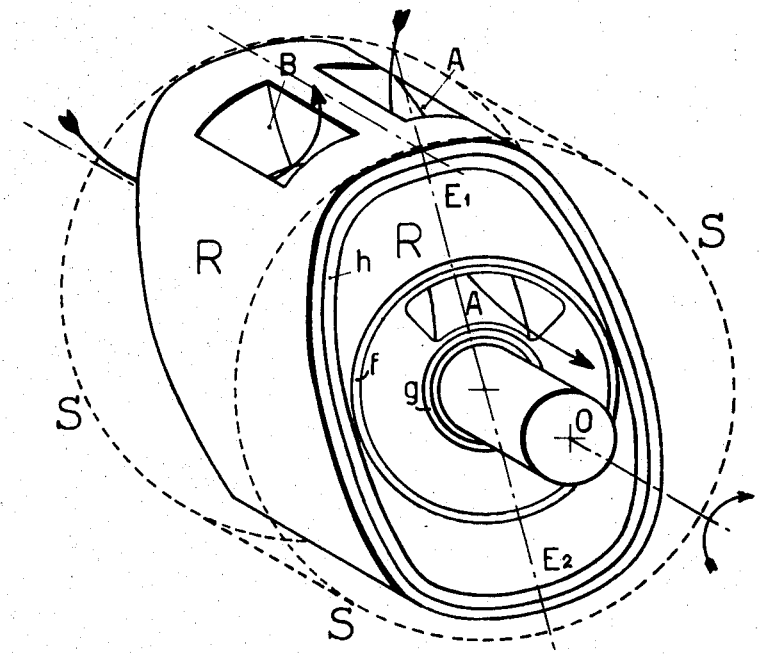
FIG. 2 is a perspective view of the rotor of the apparatus shown in FIG. 1.

Fluid motion into and out of the stator cavity is controlled in a manner seen in FIG. 2 which is a perspective view of the rotor R, the stator being indicated in phantom view by the broken lines S.

There are two ports or passages in the rotor body. A port A has an orifice in the curved surface of the lobe $E_1$ which is farthest removed from the axis of the shaft O. The port A sequentially connects the engine chambers with an annular exhaust header formed in the front head of the stator to collect the expanded combustion gases and to exhaust them through non-illustrated discharge ducts. A port B has an orifice which is behind the orifice of the port A in the lobe $E_1$ face. The projections f and g cooperate with non-illustrated spring, and admits fresh fuel mixture from an annular header formed in the rear head of the stator and not visible in FIG. 2.

In FIG. 2 the location of the exhaust header is indicated by two annular projections f and g on the radial rotor face. The projections f and g cooperate with non-illustrated spring biased annular seating members on the flat internal faces of the stator.

During each turn of the rotor, the number of explosions (or working strokes) for each chamber is equal to the number of pairs of lobes $E_1$, $E_2$ on the rotor. The number of explosions per turn of the rotor is equal to the number of vanes (which must be equal to or greater than 2) multiplied by the number of lobe pairs. The total swept volume of the engine is the product of the maximum volume of a single chamber and of the number of vanes.

Figure 3:
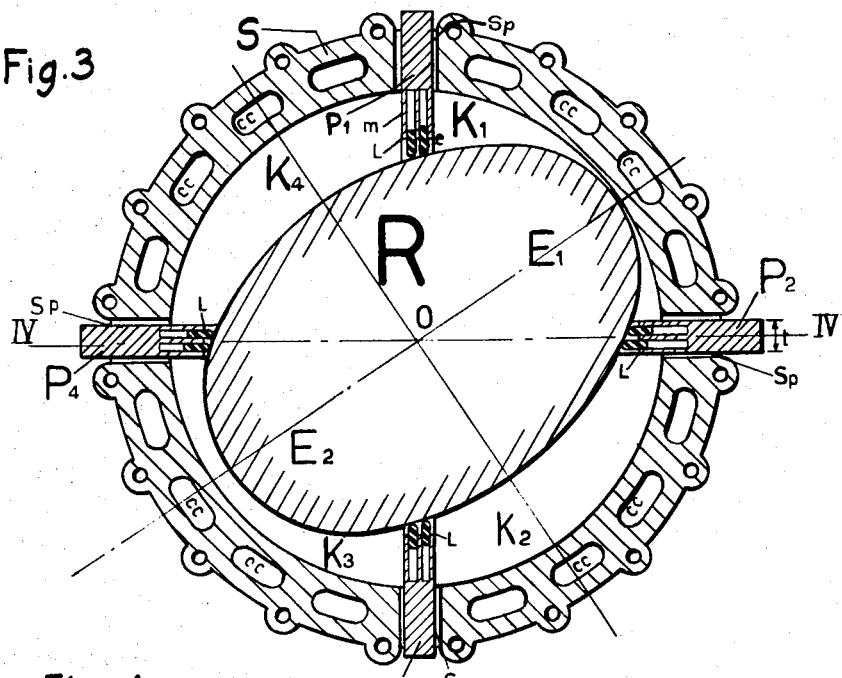
FIG. 3 shows a modified embodiment of the invention in a sectional view III—III of FIG. 4.
Figure 4:
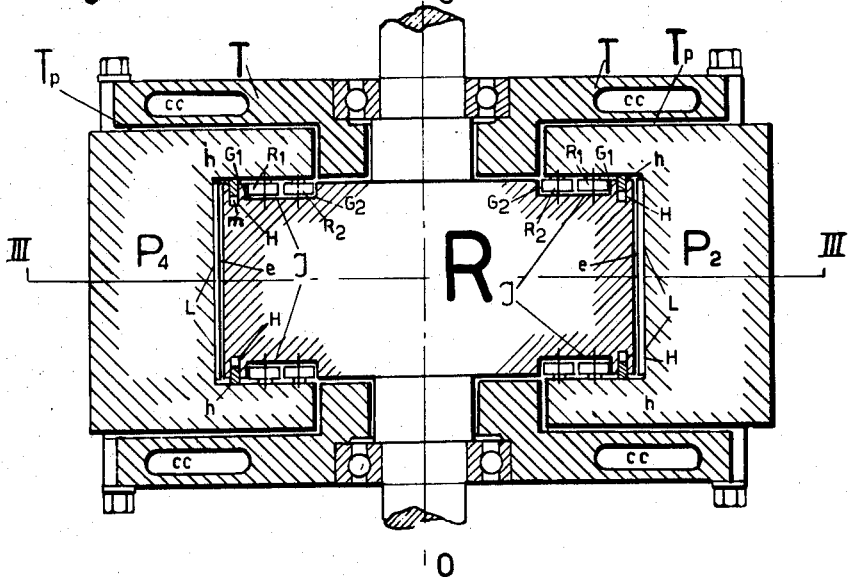
FIG. 4 is a sectional view taken on the line IV—IV of FIG. 3.

FIGS. 3 and 4 show a modified embodiment in respective views taken in section perpendicular to the shaft O and in an axial plane.

The four vanes $P'_1$, $P'_2$, $P'_3$, $P'_4$ are flat plates as best seen in FIG. 5 which shows a vane and adjacent elements of the engines of FIGS. 3 and 4.

The vanes are supported and guided between relatively large surfaces of stator slots S*p* in the cylindrical wall of the stator and in grooves T*p* in the two stator heads T. The stator is fitted with passages *cc* for the circulation of a coolant. Therefore the four vanes slide between cooled and easily lubricated surfaces, which take up all the stresses transmitted from the fluid in the chambers to the vanes.

Vane motion is controlled by internal cam faces $G_1$, $G_2$ in annular grooves J on the flat radial surfaces of rotor R. The grooves are easily lubricated, and are spaced away from the engine chambers. They are therefore not exposed to the high pressure and temperature of the combustion gases. The simple and compact rotor R can be easily cooled in a manner not further illustrated.

The outer circumferential cam faces $G_1$ are engaged by rolls $R_1$ of each vane and the inner cam faces $G_2$ by rolls $R_2$. The radial vane motions are therefore determined by the rotation of the cam faces $G_1$ and $G_2$.

The vanes move substantially without making direct contact with the various surfaces facing them. Sealing elements *e*, disposed in the innermost portions L of the vanes and biased by springs *m* toward the lobed rotor surface, seal the four engine chambers $K_1$, $K_2$, $K_3$, $K_4$ from each other. Sealing members *h*, housed in seats H in the flat faces of the rotor R are pressed by springs *m* against the flat inner surfaces of the stator heads T, and seal the clearances between rotor and stator. Sealing members *d*, *f*, and *g*, mounted in the stator, close the clearances between the vanes and the slots S*p* and grooves T*p*.

The rotor R comprises spark plugs and intake and exhaust ports as shown in FIGS. 1 and 2, but omitted from FIGS. 3, 4 and 5 for sake of clarity.

The second embodiment of the invention operates as a four stroke internal combustion engine in the manner described with reference to FIGS. 1 and 2.

It will be appreciated that ignition in chamber $K_3$ must be timed so that combustion in the chamber begins after the radially outermost portion of the lobe $E_2$ passes the center of the chamber wall between the vanes $P_3$, $P_4$, and the analogous considerations apply throughout the several embodiments illustrated.

The engines may be modified in an obvious manner for use as two stroke internal combustion engines, steam engines, pneumatic and hydraulic engines, vacuum pumps, air compressors and hydraulic pumps, servomotors and servocontrols, speed variators, etc.

The vanes in the engines of the invention transmit the stresses induced by the fluid in the engine to elements outside the stator chambers which are readily accessible for cooling and lubrication. The cam mechanism which controls the vane movement also is arranged outside the stator chambers. The vanes are guided in such a manner that they move in close proximity to the rotor without actually making direct contact therewith. The clearance between the rotor and vanes is adjustable. The contact pressure of the seals between the vanes and other elements of the engine is independent of the fluid pressure in the stator cavity, and is provided by resilient elements.

The configuration of the lobes $E_1$ and $E_2$ provides a desired difference between the compression ratio for the fresh fuel mixture, and the expansion ratio for the spent combustion gases. The mixture and the combustion gases pass through ports in the rotor inward and outward of the several engine chambers. The passages in the rotor are readily laid out in such a manner that the residual energy of the discharged combustion gases flowing therethrough is converted into rotary engine power, and that the admitted fuel mixture be accelerated by its passage through the rotor.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What we claim is:
1. In a rotary engine, in combination:
(a) a stator member having an axis, and including a wall of substantially circular cross section about said axis and two axially spaced head means extending transversely of said axis, said wall and said head means defining a substantially closed cavity in said stator member;
(b) a rotor member arranged in said cavity for rotation about said axis, said rotor member sealingly engaging said head means and having an axially extending circumferential face of arcuate cross section in said cavity opposite said wall, said face having
(1) a first circumferential portion closely adjacent said wall and remote from said axis,
(2) a second circumferential portion nearer said axis and more remote from said wall than said first portion, and
(3) third and fourth circumferential portions interposed between said first and second portions, and respectively extending clockwise and counterclockwise from said first portion toward said second portion, said third and fourth portions being nearer said axis and farther removed from said wall than said first and second portions;
(c) a plurality of vanes sealingly guided in said wall for movement inward and outward of said cavity, said vanes, said circumferential face, said wall, and said head means defining a plurality of chambers in said cavity;
(d) vane actuating means responsive to rotation of said rotor member about said axis for actuating said movement of said vanes while holding the same in sealing engagement with said circumferential face of said rotor member;
(e) port means for admitting an explosive fluid to said chambers and for withdrawing the products of explosion of said fluid from said chambers in timed sequence in response to rotation of said rotor member about said axis;
(f) ignition means in each chamber for initiating the explosion of said fluid; and
(g) shaft means rotatably supported by said stator member and connected to said rotor member for joint rotation.

2. In a rotary engine as set forth in claim 1, said circumferential face of said rotor member being of continuously convex arcuate cross section.

3. In a rotary engine as set forth in claim 1, said rotor member being of ovoid cross section and being mounted eccentrically with respect to said axis.

4. In a rotary engine as set forth in claim 1, said vane actuating means including a cam member connected to said rotor member for movement thereby when said rotor member rotates about said axis, a plurality of pivots on said stator member outside said cavity, said pivots having respective axes, a vane carrier mounted on each of said pivots for movement about the axis thereof and carrying one of said vanes for said movement of said vane when said carrier moves about the axis of the associated pivot, and a cam follower member mounted on said carrier and engaging said cam member.

5. In a rotary engine as set forth in claim 4, said rotor member being mounted on said shaft means in said cavity, and said cam member being mounted on said shaft means outside said cavity.

6. In a rotary engine as set forth in claim 5, said cam follower member having a face portion normally engaging said cam member, and adjusting means on said carrier for moving said face portion relative to said carrier in a direction toward and away from said cam member.

7. In a rotary engine as set forth in claim 1, said vane actuating means including an annular cam face on said rotor member in said cavity, and cam follower means on each of said vanes and engaging said cam face for actuating said movement of said vanes.

References Cited by the Examiner
UNITED STATES PATENTS

| | | | |
|---|---|---|---|
| 590,581 | 9/1897 | Long | 91—107 X |
| 859,474 | 7/1907 | Williams | 123—15 |
| 1,039,028 | 9/1912 | Clarke | 103—124 |
| 1,145,161 | 7/1915 | Mears | 123—15 |
| 1,241,297 | 9/1917 | Stauber | 230—149 |
| 1,366,919 | 2/1921 | Marvin | 123—15 |
| 1,810,082 | 6/1931 | Marvin | 123—15 |
| 2,041,121 | 5/1936 | Fareso | 103—124 |
| 2,214,833 | 9/1940 | Hocker | 123—14 |
| 2,366,213 | 1/1945 | Pover | 123—14 |
| 2,674,234 | 4/1954 | Riggle | 123—15 |
| 2,744,505 | 5/1956 | Sherman | 123—15 |

FOREIGN PATENTS

| | | |
|---|---|---|
| 396,232 | 1/1909 | France. |

SAMUEL LEVINE, *Primary Examiner.*

LAURENCE V. EFNER, KARL J. ALBRECHT,
*Examiners.*